(12) United States Patent
Schreiner et al.

(10) Patent No.: US 11,743,553 B2
(45) Date of Patent: *Aug. 29, 2023

(54) DATA PROCESSOR AND TRANSPORT OF USER CONTROL DATA TO AUDIO DECODERS AND RENDERERS

(71) Applicant: Fraunhofer-Gesellschaft zur Foerderung der angewandten Forschung e.V., Munich (DE)

(72) Inventors: Stephan Schreiner, Birgland (DE); Simone Neukam, Kalchreuth (DE); Harald Fuchs, Roettenbach (DE); Jan Plogsties, Fuerth (DE); Stefan Doehla, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,397

(22) Filed: May 20, 2022

(65) Prior Publication Data

US 2022/0286756 A1 Sep. 8, 2022

Related U.S. Application Data

(63) Continuation of application No. 15/931,422, filed on May 13, 2020, now Pat. No. 11,381,886, which is a (Continued)

(30) Foreign Application Priority Data

May 28, 2014 (EP) .................................... 14170416

(51) Int. Cl.
*H04N 21/81* (2011.01)
*H04N 21/435* (2011.01)
(Continued)

(52) U.S. Cl.
CPC ......... *H04N 21/8106* (2013.01); *G10L 19/00* (2013.01); *G10L 19/167* (2013.01);
(Continued)

(58) Field of Classification Search
CPC ............. H04N 21/8106; H04N 21/435; H04N 21/4363; H04N 21/4394; H04N 21/44222;
(Continued)

(56) References Cited

U.S. PATENT DOCUMENTS 6,642,966 B1   11/2003 Limaye
7,933,769 B2   4/2011 Bessette
(Continued)

FOREIGN PATENT DOCUMENTS

CN   1355652 A   6/2002
CN   1786964 A   6/2006
(Continued)

OTHER PUBLICATIONS

"Information technology—Generic coding of moving pictures and associated audio information: Systems", ISO/IEC 13818-1:2013, Recommendation ITU-T H.222.0, Jun. 2012, 228 pages.
(Continued)

*Primary Examiner* — Anthony Bantamoi
(74) *Attorney, Agent, or Firm* — Perkins Coie LLP; Michael A. Glenn

(57) ABSTRACT

Audio data processor, having: a receiver interface for receiving encoded audio data and metadata related to the encoded audio data; a metadata parser for parsing the metadata to determine an audio data manipulation possibility; an interaction interface for receiving an interaction input and for generating, from the interaction input, interaction control data related to the audio data manipulation possibility; and a data stream generator for obtaining the interaction control
(Continued)

data and the encoded audio data and the metadata and for generating an output data stream, the output data stream having the encoded audio data, at least a portion of the metadata, and the interaction control data.

18 Claims, 8 Drawing Sheets

Related U.S. Application Data continuation of application No. 15/357,640, filed on Nov. 21, 2016, now Pat. No. 10,674,228, which is a continuation of application No. PCT/EP2015/056768, filed on Mar. 27, 2015.

(51) Int. Cl.
  H04N 21/439 (2011.01)
  H04N 21/485 (2011.01)
  G10L 19/16 (2013.01)
  H04N 21/442 (2011.01)
  H04N 21/4363 (2011.01)
  G10L 19/00 (2013.01)

(52) U.S. Cl.
  CPC ....... *H04N 21/435* (2013.01); *H04N 21/4363* (2013.01); *H04N 21/4394* (2013.01); *H04N 21/44222* (2013.01); *H04N 21/44227* (2013.01); *H04N 21/4852* (2013.01)

(58) Field of Classification Search
  CPC ......... H04N 21/44227; H04N 21/4852; H04N 21/4355; G10L 19/00; G10L 19/167
  See application file for complete search history.

(56) References Cited

U.S. PATENT DOCUMENTS

| | | | |
|---|---|---|---|
| 2006/0133624 A1 | 6/2006 | Waserblat et al. | |
| 2006/0190247 A1 | 8/2006 | Lindblom | |
| 2007/0225971 A1 | 9/2007 | Bessette | |
| 2009/0063159 A1 | 3/2009 | Crockett | |
| 2009/0232326 A1 | 9/2009 | Gordon et al. | |
| 2010/0014692 A1 | 1/2010 | Schreiner et al. | |
| 2010/0032490 A1 | 2/2010 | Mabboux | |
| 2010/0083344 A1 | 4/2010 | Schildbach et al. | |
| 2012/0057715 A1 | 3/2012 | Johnston et al. | |
| 2012/0082240 A1 | 4/2012 | Takada et al. | |
| 2012/0185769 A1* | 7/2012 | Whitley | G06F 3/16 |
| 2012/0243690 A1 | 9/2012 | Engdegard et al. | |
| 2014/0119581 A1 | 5/2014 | Tsingos et al. | |
| 2015/0325243 A1 | 11/2015 | Grant et al. | |
| 2017/0195819 A1 | 7/2017 | Harder et al. | |

FOREIGN PATENT DOCUMENTS

| | | | |
|---|---|---|---|
| CN | 101160616 | A | 4/2008 |
| CN | 102171755 | A | 8/2011 |
| CN | 1957398 | B | 9/2011 |
| CN | 102461173 | A | 5/2012 |
| CN | 103270508 | A | 8/2013 |
| CN | 102100088 | B | 10/2013 |
| EP | 2637427 | A1 | 9/2013 |
| EP | 2838087 | A1 | 2/2015 |
| JP | 2015530825 | A | 10/2015 |
| KR | 20070027008 | A | 3/2007 |
| KR | 20070098930 | A | 10/2007 |
| KR | 20120082462 | A | 7/2012 |
| RU | 2393556 | C2 | 6/2010 |
| WO | 2013006330 | A2 | 1/2013 |
| WO | 2013078056 | A1 | 5/2013 |
| WO | 2013153967 | A1 | 10/2013 |

OTHER PUBLICATIONS

"Digital audio—Interface for non-linear PCM encoded audio bitstreams applying IEC 60958—Part 11: MPEG-4 AAC and its extensions in LATM/LOAS", IEC 61937-11 , 2010, 15 pages.

"Digital audio interface—Part 3: Consumer applications", IEC 60958-3: , Feb. 2016, 67 pages.

"Format for Non-PCM Audio and Data in AES3—MPEG-4 AAC and HE AAC Compressed Digital Audio in ADTS and LATM / LOAS Wrappers", SMPTE ST 2041-3:2010 , Aug. 2, 2010 , 18 pages.

"Text of ISO/IEC 23008-3/CD, 3D audio", ISO/IEC JTC1/SC29/WG11 N14459, València, Spain , Apr. 15, 2014 , 339 pages.

"WD of Amd.x to ISO/IEC 13818-1 2013-Carriage of ISO/IEC 23008-3 (MPEG-H 3D) Audio", 108. MPEG Meeting; Mar. 31, 2014-Apr. 4, 2014; VALENCIA; No. N14321 , Mar. 2014, 6 pages.

Fueg, Simone , et al. , "Interface for User Interaction" , Fraunhofer IIS, ISO/IEC JTC1/SC29/WG11, Meeting of AHG on 3D Audio, DRC and Audio Maintenance, Paris, France , 6 pages.

Fueg, Simone , et al. , "Rendering Interfaces to the MPEG-H 3D Audio decoder" , Fraunhofer IIS, ISO/IEC JTC1/SC29/WG11, Meeting of AHG on 3D Audio, DRC and Audio Maintenance, Paris, France , 9 pages.

Herre, Jurgen , et al. , "MPEG Spatial Audio Object Coding—The ISO/MPEG Standard for Efficient Coding of Interactive Audio Scenes", J. Audio Eng. Soc. vol. 60, No. 9 , pp. 655-673.

Plogsties, Jan, et al. , "Object Interaction Use Cases and Technology", MPEG Meeting, Valencia, Mar. 31, 2014-Apr. 4, 2014, No. 33224 , 20 pages.

Schreiner, Stepahn , et al. , "Proposed MPEG-H 3D Audio stream format", 108. MPEG Meeting; Mar. 31, 2014- Apr. 4, 2014; VALENCIA; No. M33190 , 5 pages.

\* cited by examiner

DATA PROCESSOR AND TRANSPORT OF USER CONTROL DATA TO AUDIO DECODERS AND RENDERERS

CROSS-REFERENCE TO RELATED APPLICATIONS

This application is a continuation of U.S. patent application Ser. No. 15/931,422, filed May 13, 2020, which is a continuation of U.S. patent application Ser. No. 15/357,640, filed Nov. 21, 2016, now U.S. Pat. No. 10,674,228, issued Jun. 2, 2020, which is a continuation of International Application No. PCT/EP2015/056768, filed Mar. 27, 2015, which claims priority from European Application No. 14170416.3, filed May 28, 2014, which are each incorporated herein in its entirety by this reference thereto.

BACKGROUND OF THE INVENTION

The present invention is concerned with an audio data processor according to claim 1, a method for processing audio data according to claim 14 and a computer program according to claim 15 for performing the method of processing audio data.

In home Consumer Electronics (CE) installations, functionality is spread over several devices connected via standardized interfaces. Further, (high quality) equipment is often build not only into a single device, but sophisticated single devices are available (consider Set-Top Boxes, TV-Set, AVR-Receiver). These devices communicate via standardized interfaces (such as HDMI).

While a first device extracts the desired streams and offers all interfaces to the user, a second device often performs decoding in "slave mode" without any interface to the user. When it comes to user interaction and control of the decoder, it is essential to convey this user information from device #1 to device #2 in this scenario.

For instance, as shown in FIG. 9, a television program is often received by a first device such as a set-top box, which selects the appropriate transmission channel and extracts relevant elementary streams containing desired coded essence. These extracted streams may be fed to a second device such as an Audio-Video-Receiver for reproduction. The transmission between these two devices may be accomplished by either transmitting a decoded/decompressed representation (PCM audio), or in an encoded representation, especially if bandwidth restrictions apply on the used interconnection line.

Further, as selecting desired streams and/or optionally user interaction is accomplished in device #1 (e.g. set-top box), in most cases only this device offers a control interface to the user. The second device (e.g. A/V Receiver) only provides a configuration interface which is usually accessed only once by the user when setting up the system and acts in "slave mode" at normal operation times.

Modern audio codec schemes do not only support encoding of audio signals, but also provide means for user interactivity to adapt the audio play-out and rendering to the listener's preferences. The audio data stream consists of a number of encoded audio signals, e.g. channel signals or audio objects, and accompanying meta-data information that describes how these audio signals form an audio scene that is rendered to loudspeakers.

Examples for audio objects are:
dialogue in different languages,
additional dialogue like audio description, or
music and effects background.

Examples for meta-data information are:
the default volume level of each object signal (i.e. how loud it has to be mixed into the mixed signal for loudspeaker presentation),
the default spatial position (i.e. where it has to be rendered),
information, if user interaction is allowed for a specific object, or
information how the user is allowed to interact, e.g. minimum/maximum volume levels or restrictions on the positions the user may re-pan the objects to.
classification and/or description of audio objects To accomplish the user interactivity, audio decoders/renderers (e.g. device #2) need to provide an additional (input or interaction) interface for control information for the desired user interaction.

It might alternatively also be desirable to implement user control for audio object selection and manipulation in device #1 and feed this data to device #2 when decoding and rendering is implemented in device #2 and not in device #1.

However, transmission of such data is restricted due to the fact that existing standardized connections do not support transmission of user control data and/or renderer information.

Alternatively, the selection of streams and the user interaction as described above for device #1, and the decoding as described above for device #2 may be processed by two separate functional components contained within the same device and with the same restrictions on the data transmission between both components, namely that only one interface for coded data and user interaction data is available, advantageously the interaction interface of device #1, while a second interface for user interaction data, i.e. an interface usually provided by device #2, can be omitted. Even though both device #1 and device #2 are contained or implemented within the same (hardware) device, this leads to the same situation as described for the case of separated devices #1 and #2.

In order to accomplish the described use case and to overcome above described limitations, it is proposed to embed the user control information data, or interaction data in general, into the encoded audio data stream.

SUMMARY

According to an embodiment, an audio data processor may have: a receiver interface for receiving encoded audio data and metadata related to the encoded audio data; a metadata parser for parsing the metadata to determine an audio data manipulation possibility; an interaction interface for receiving an interaction input and for generating, from the interaction input, interaction control data related to the audio data manipulation possibility; and a data stream generator for obtaining the interaction control data and the encoded audio data and the metadata and for generating an output data stream, the output data stream having the encoded audio data, at least a portion of the metadata, and the interaction control data.

According to another embodiment, a method for processing audio data may have the steps of: receiving encoded audio data and metadata related to the encoded audio data; parsing the metadata to determine an audio data manipulation possibility; receiving an interaction input and generating, from the interaction input, interaction control data related to the audio data manipulation possibility; and obtaining the interaction control data and the encoded audio data and the metadata and generating an output data stream, the output data stream having the encoded audio data, at least a portion of the metadata, and the interaction control data.

Another embodiment may have a computer program for performing, when running on a computer or a processor, a method for processing audio data, the method having the steps of: receiving encoded audio data and metadata related to the encoded audio data; parsing the metadata to determine an audio data manipulation possibility; receiving an interaction input and generating, from the interaction input, interaction control data related to the audio data manipulation possibility; and obtaining the interaction control data and the encoded audio data and the metadata and generating an output data stream, the output data stream having the encoded audio data, at least a portion of the metadata, and the interaction control data.

Generally, the first device can be configured as an audio data processor, comprising: a receiver interface for receiving encoded audio data and metadata related to the encoded audio data; a metadata parser for parsing the metadata to determine an audio data manipulation possibility; an interaction interface for receiving an interaction input and for generating, from the interaction input, interaction control data related to the audio data manipulation possibility; and a data stream generator for obtaining the interaction control data and the encoded audio data and the metadata and for generating an output data stream, the output data stream comprising the encoded audio data, at least a portion of the metadata, and the interaction control data as defined in claim 1. Other advantageous embodiments are defined in the enclosed dependent and further independent claims.

The encoded audio data may comprise separate encoded audio objects, wherein at least a portion of the metadata is related to a corresponding audio object, wherein the metadata parser is configured to parse the corresponding portion for the encoded audio objects to determine, for at least an audio object, the object manipulation possibility, wherein the interaction interface is configured to generate, for the at least one encoded audio object, the interaction control data from the interaction input related to the at least one encoded audio object. Thus, audio objects can be easily and directly manipulated within their corresponding object manipulation possibilities stored within the metadata by using respective interaction control data.

The interaction interface may be configured to present, to a user, the audio data manipulation possibility derived from the metadata by the metadata parser, and to receive, from the user, a user input on the specific data manipulation of the data manipulation possibility. This may realize a practical way to provide a user interface to a user for interacting with the inventive device, e.g. for manipulating audio objects, advantageously externally from a decoder.

The data stream generator may be configured to process a data stream comprising the encoded audio data and the metadata received by the receiver interface without decoding the encoded audio data, or to copy the encoded audio data and at least a portion of the metadata without changes in the output data stream, wherein the data stream generator is configured to add an additional data portion containing the interaction control data to the encoded audio data and/or the metadata in the output data stream. This provides the advantage of less complexity as the audio data processor does not need to decode audio signals. It only needs to parse the meta-data and writes it back to the meta-data part of the encoded audio data stream.

The data stream generator may be configured to generate, in the output data stream, the interaction control data in the same format as the metadata. Thus, any interaction control data can be advantageously integrated into the output data stream.

The data stream generator may be configured to associate, with the interaction control data, an identifier in the output data stream, the identifier being different from an identifier associated with the metadata. The advantage of using a different identifier for the manipulated meta-data is that a remote decoder could be enabled to identify the interaction from the received manipulated data stream while also receiving the original data.

The data stream generator may be configured to add, to the interaction control data, signature data, the signature data indicating information on an application, a device or a user performing an interaction, e.g. an audio data manipulation or providing the user input. By transporting original and manipulated data a reset of the meta-data is possible. A signature in the metadata allows to track the origin of the manipulation.

The metadata parser may be configured to identify a disabling possibility for one or more audio objects represented by the encoded audio data, wherein the interaction interface is configured for receiving a disabling information for the one or more audio objects, and wherein the data stream generator is configured for marking the one or more audio objects as disabled in the interaction control data or for removing the disabled one or more audio objects from the encoded audio data so that the output data stream does not include encoded audio data for the disabled one or more audio objects. Thus, the data stream can be adapted to those audio objects that are actually or currently available such that the total data content of a current bit stream can be reduced.

The data stream generator may be configured to dynamically generate the output data stream, wherein in response to a new interaction input, the interaction control data is updated to match the new interaction input, and wherein the data stream generator is configured to include the updated interaction control data in the output data stream. Thus, a data stream can be sent with real-time information. In other words, interaction input concerning any audio object specific values can be updated and processed in a fast manner, advantageously in real-time.

The receiver interface may be configured to receive a main audio data stream comprising the encoded audio data and metadata related to the encoded audio data, and to additionally receive optional audio data comprising an optional audio object, wherein the metadata related to said optional audio object is contained in said main audio data stream. With this configuration, the audio data processor can merge the encoded audio data of the selected optional audio object into the main audio data stream resulting in a complete output audio data stream generated by the data stream generator. Thus, optional audio objects can be additionally provided to a user subsequently or on demand.

The metadata parser may be configured to determine the audio manipulation possibility for a missing audio object not included in the encoded audio data, wherein the interaction interface is configured to receive an interaction input for the missing audio object, and wherein the receiver interface is configured to request audio data for the missing audio object from an audio data provider or to receive the audio data for the missing audio object from a different substream contained in a broadcast stream or an internet protocol connection. Thus, a device or a user can manipulate an optionally available additional audio object in advance, i.e. while it is actually missing. The additional audio object can then be requested subsequently via the Internet or another broadcast stream.

The data stream generator may be configured to assign, in the output data stream, a further packet type to the interaction control data, the further packet type being different from packet types for the encoded audio data and the metadata, or wherein the data stream generator is configured to add, into the output data stream, fill data in a fill data packet type, wherein an amount of fill data is determined based on a data rate requirement determined by an output interface of the audio data processor. Thus, only one further packet type needs to be assigned in order to accomplish the transport of manipulated meta-data or interaction control data, respectively. In addition, the audio data processor may want to add additional fill data into a subsequent data transmission stream to meet the given, usually higher data rate requirement for that link. This fill data may contain no information and is expected to be ignored by the decoder.

The audio data processor may be implemented as a separate device, wherein the receiver interface may form an input to the separate device via a wired or wireless connection, wherein the audio data processor may further comprise an output interface connected to the data stream generator, the output interface being configured for outputting the output data stream, wherein the output interface performs an output of the device and comprises a wireless interface or a wire connector. Thus, a simple connectivity, for example within a network, can be provided.

The present invention may further be realized by a method for processing audio data, the method comprising: receiving encoded audio data and metadata related to the encoded audio data; parsing the metadata to determine an audio data manipulation possibility; receiving an interaction input and generating, from the interaction input, interaction control data related to the audio data manipulation possibility; and obtaining the interaction control data and the encoded audio data and the metadata and generating an output data stream, the output data stream comprising the encoded audio data, at least a portion of the metadata, and the interaction control data.

The present invention may further be realized by a computer program for performing, when running on a computer or a processor, the aforementioned method of processing audio data.

The present invention may further be realized by the following embodiments:

The audio data manipulation possibility may be selected from a group comprising at least one of an object selection, a selection out of several languages, a selection of optional additional audio objects, an object manipulation, a changing volume of one or more objects, a changing of position of objects like moving an additional commentary from a center speaker to a right speaker or an arbitrary position in between, a selection of presets, instead of selecting and manipulating each object separately, wherein a preset from the metadata is selected, where a preset is a pre-selection of objects recommended by a content creator for a specific application or a specific usage scenario, where a preset contains a combination of objects with for example different volume levels, positions and loudness/dynamic range compression data compared to a default presentation.

The data stream generator may be configured to generate the interaction control data as independent information or as dependent information, wherein the dependent information is dependent on the metadata and results, if applied to decoded audio data, together with the metadata in a data manipulation defined by the interaction input.

The encoded audio data may comprise optional audio objects and the metadata may comprise metadata for the optional audio objects, wherein the receiver interface may be configured to additionally receive a main audio data stream having main audio data, wherein the data stream generator may be configured to generate the output data stream so that the output data stream additionally comprises the main audio data.

The data stream generator may be configured to add error protection data to the output data stream and to assign a further packet type to error protection data, wherein the data stream generator is configured to derive the error protection data from the encoded audio data, the metadata or the interaction control data.

The data stream generator may be configured to generate the output data stream as a data stream for streaming or as a container-based file in a file format such as the ISO MPEG-4 file format.

It is further suggested that the audio data processor does not have a functionality to decode the encoded audio data.

The audio data processor may be implemented in a set top box, a television set or an audio/video recorder-receiver.

The audio data processor may further comprise an output interface for transmitting the output data stream to a further device via an HDMI connection.

The audio data processor may also be provided, i.e. integrated or implemented, together with a decoder within the same (hardware) device. For example, the audio data processor and a decoder may be together provided within a TV, a Set-Top Box, an AN Receiver, or the like. The audio data processor and the decoder may communicate via internal data bus structures. Such a configuration may be particularly desired in TV-devices comprising System-on-Chip (SoC) solutions.

Accordingly or alternatively, the audio data processor may be implemented as an independent and separate functional component in the same device similar to the case described above for the case of a separate device, with the only difference that the output interface performs an output of the audio data processor on a connection internal to the device, for example using an internal data bus.

With respect to the features mentioned above, the audio data processor according to the invention is able to provide easy interaction with a device or a user while, at the same time, providing a simple device setup, advantageously using existing installations.

Furthermore, the audio data processor according to the invention provides a solution to the above mentioned problem by embedding a device interaction or user interaction as additional interaction data within the audio bitstream. By implementing the above described features, the decoder implementations may necessitate only one interface which takes both encoded representation data and interaction control data. Already existing interconnections may not need to implement new channels for control information, but implementation effort is moved into the codec itself. In complex setups, it is further ensured that the interaction control information is closely tied to the encoded essence and therefore may not be lost when fed through several processing stages.

BRIEF DESCRIPTION OF THE DRAWINGS

Examples of embodiments according to the present invention are shown in the drawings and will be explained in the following, wherein.

DETAILED DESCRIPTION OF THE INVENTION

In this document as a whole, and in particular in the following description, the term "interaction" is used in the sense of an interaction by a user or an interaction by a device, as well as an interaction in general, i.e. an interaction in the common sense. In other words, "interaction" can mean a "user interaction" or a "device interaction", or an interaction in general. In certain parts of the description, the terms "user" and "interaction" are used synonymously. For example, a user interface may be synonymously used in the sense of an interaction interface and the other way around.

Furthermore, a "user" can be either a human user or a machine user, such as a (hardware) device or a software-implemented device.

Further, the user interface may be present as device specific preset configuration which, exclusively or in addition to the user input, may control the data manipulation.

Figure 1:
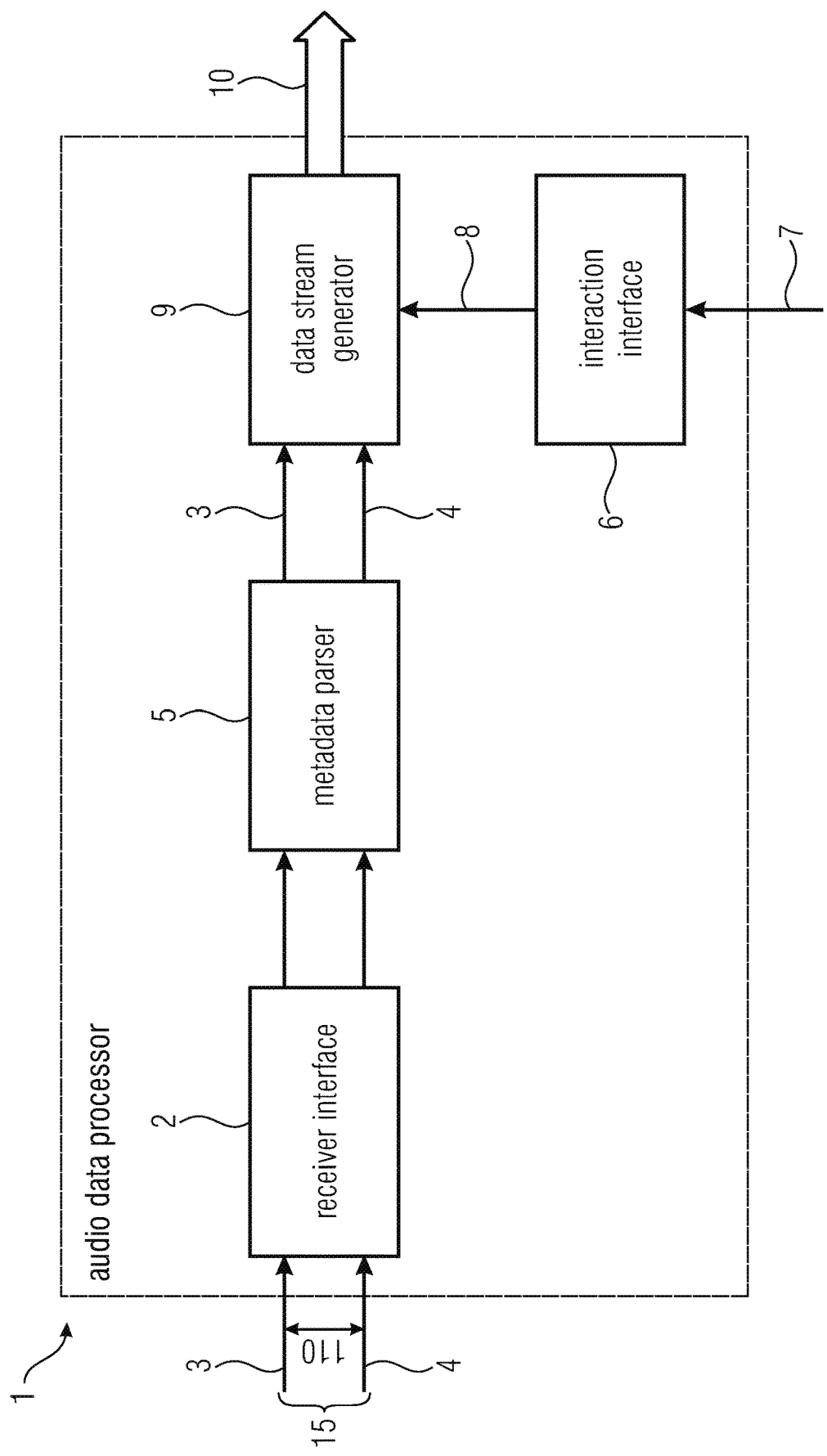
FIG. 1 shows an audio data processor according to the present invention.

FIG. 1 shows an audio data processor 1 according to the present invention. The audio data processor 1 comprises a receiver interface 2 for receiving an encoded input stream 15 that comprises encoded audio data 3 and metadata 4. The metadata 4 is related to the encoded audio data 3, which relation is indicated by arrow 110. For example, the encoded audio data 3 may contain audio objects while the metadata 4 may contain further information about manipulation possibilities of said audio objects.

The audio data processor 1 further comprises a metadata parser 5 for parsing the metadata 4 to determine an audio data manipulation possibility. For example, an adjustable volume level, an adjustable spatial position or a selectable language may represent an audio data manipulation possibility of an audio object.

Furthermore, the audio data processor 1 comprises an interaction interface 6 for receiving an interaction input 7. The interaction interface 6 is further configured to generate interaction control data 8 based on the interaction input 7. Said interaction control data 8 is related to the aforementioned audio data manipulation possibility. For example, a user may interact with the device by adjusting the volume level or the spatial position of an audio object, or by selecting a language via the interaction interface 6. In this case, the interaction interface 6 is a user interface 6 that may generate corresponding user control data 8 that is related to the user's choice.

Additionally or alternatively, the interaction interface 6 may be a device (specific) interaction interface 6. In this case, the device interaction interface 6 is configured to generate device interaction control data 8 based on device interaction input 7. For example, a device such as a headphone or the like might be connected with the interaction interface 6. The connection between headphone and interaction interface 6 can be detected by the audio processor and thus be regarded as interaction input 7. Thus, upon connection of the headphone, the interaction interface 6 provides headphone-specific interaction control data 8, such as audio-object manipulation, e.g. an automatic reduction in volume, a preselected language or an adjustment in the hardware configuration.

In other words, instead of a manual user interaction, the interaction interface 6 automatically selects objects or adjustments based on the detection of certain devices. The interaction interface 6 generates device specific interaction control data 8.

The audio data processor 1 further comprises a data stream generator 9. The data stream generator 9 obtains the interaction control data 8, the encoded audio data 3 and the metadata 4.

The data stream generator 9 is configured to generate an output data stream 10 that comprises the aforementioned interaction control data 8, the encoded audio data 3 and the metadata 4.

Figure 2:
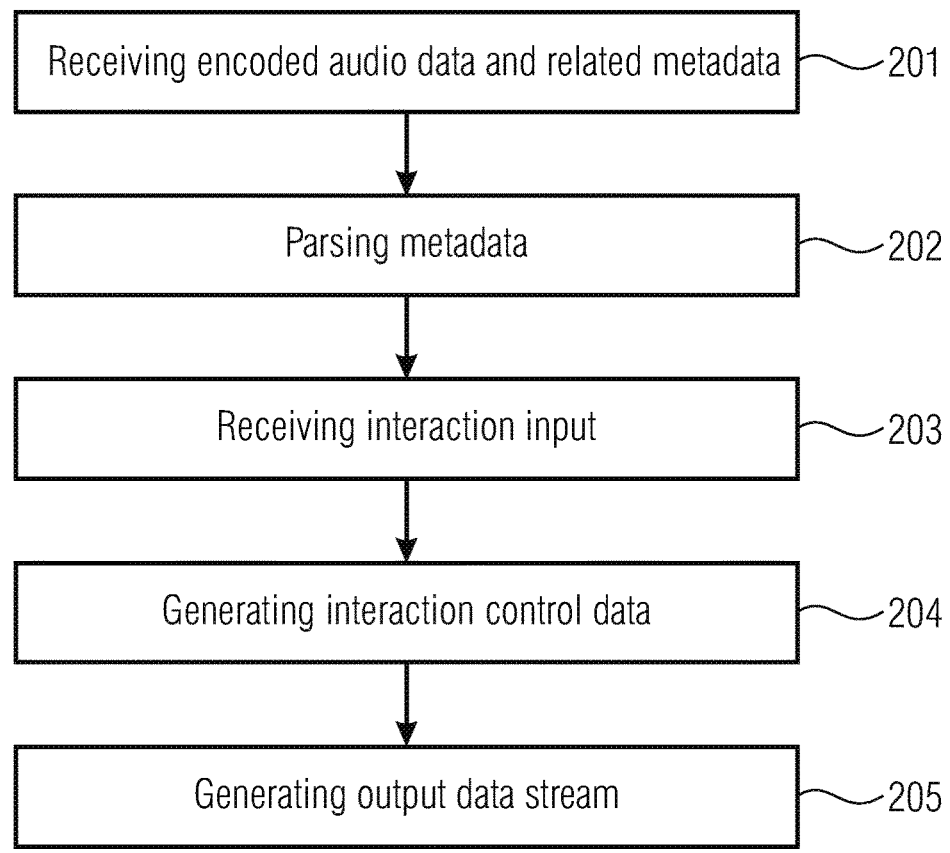
FIG. 2 shows a method for processing audio data according to the invention.

FIG. 2 shows a corresponding method for processing audio data according to the present invention.

In step 201 encoded audio data 3 and related metadata 4 is received.

In step 202 the metadata 4 is parsed to determine an audio data manipulation possibility.

In step 203 interaction input is received, wherein interaction control data related to the audio data manipulation possibility is generated from said interaction input in step 204.

In step 205 the interaction control data and the encoded audio data and the metadata is obtained, and an output data stream is generated, wherein said output data stream comprises the encoded audio data, at least a portion of the metadata and the interaction control data.

Figure 3:
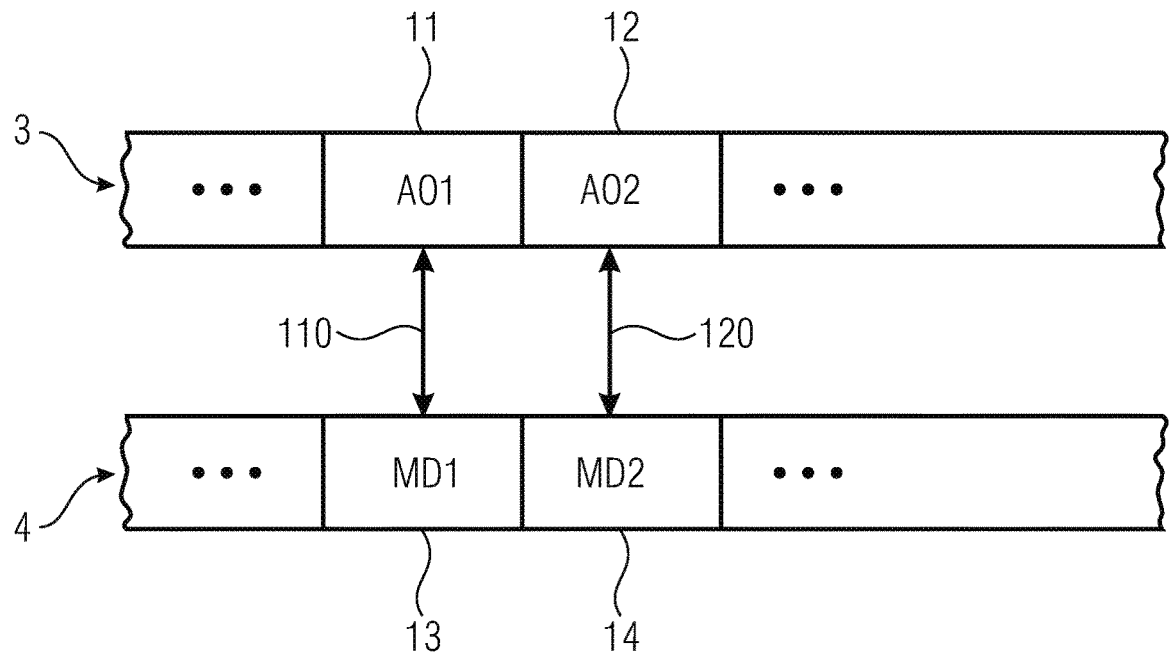
FIG. 3 shows an example of encoded audio data and related metadata.

With reference to FIG. 3, the encoded audio data 3 comprises separate encoded audio objects 11, 12. Furthermore, at least a portion 13, 14 of the metadata 4 is related (indicated by arrows 110, 120) to a corresponding audio object 11, 12. For example, the portion 'MD1' 13 of the metadata 4 is related to corresponding encoded audio object 'AO1' 11, while the portion 'MD2' 14 of the metadata 4 is related to corresponding encoded audio object 'AO2' 12.

The metadata parser 5 is configured to parse the corresponding portion 13, 14 for the encoded audio objects 11, 12 in order to determine the object manipulation possibility of at least one of said audio objects 11, 12. In other words, the metadata parser 5 parses the metadata 13, 14 for the respective audio objects 11, 12 in order to determine the audio object manipulation possibility for each audio object 11, 12. For example, the metadata parser 5 determines that audio object 'AO1' 11 may comprise an adjustable volume level. The metadata parser 5 may present this potential volume level adjustability (audio object manipulation possibility) to a user via the user interface 6.

The user interface 6 is configured to generate, for the at least one audio object 11, 12, the user control data 8 from the user input 7 related to the at least one encoded audio object 11, 12. For example, the user may want to adjust the volume level of audio object 'AO1' 11 and thus provides respective input 7 via the user interface 6. The user interface 6 generates respective user control data 8 containing the information that, and to what extent, the user wants to adjust the volume level of audio object 'AO1' 11.

Accordingly, the user interface 6 is configured to present to a user the audio object manipulation possibility of an audio object 11, 12 derived from the metadata 4 by the metadata parser 5. The user interface 6 is further configured to receive a user input 7 from the user regarding the specific data manipulation (e.g. a specific volume level or a specific language) of the data manipulation possibility (e.g. a volume level adjustment range or a set of available languages).

Figure 9:
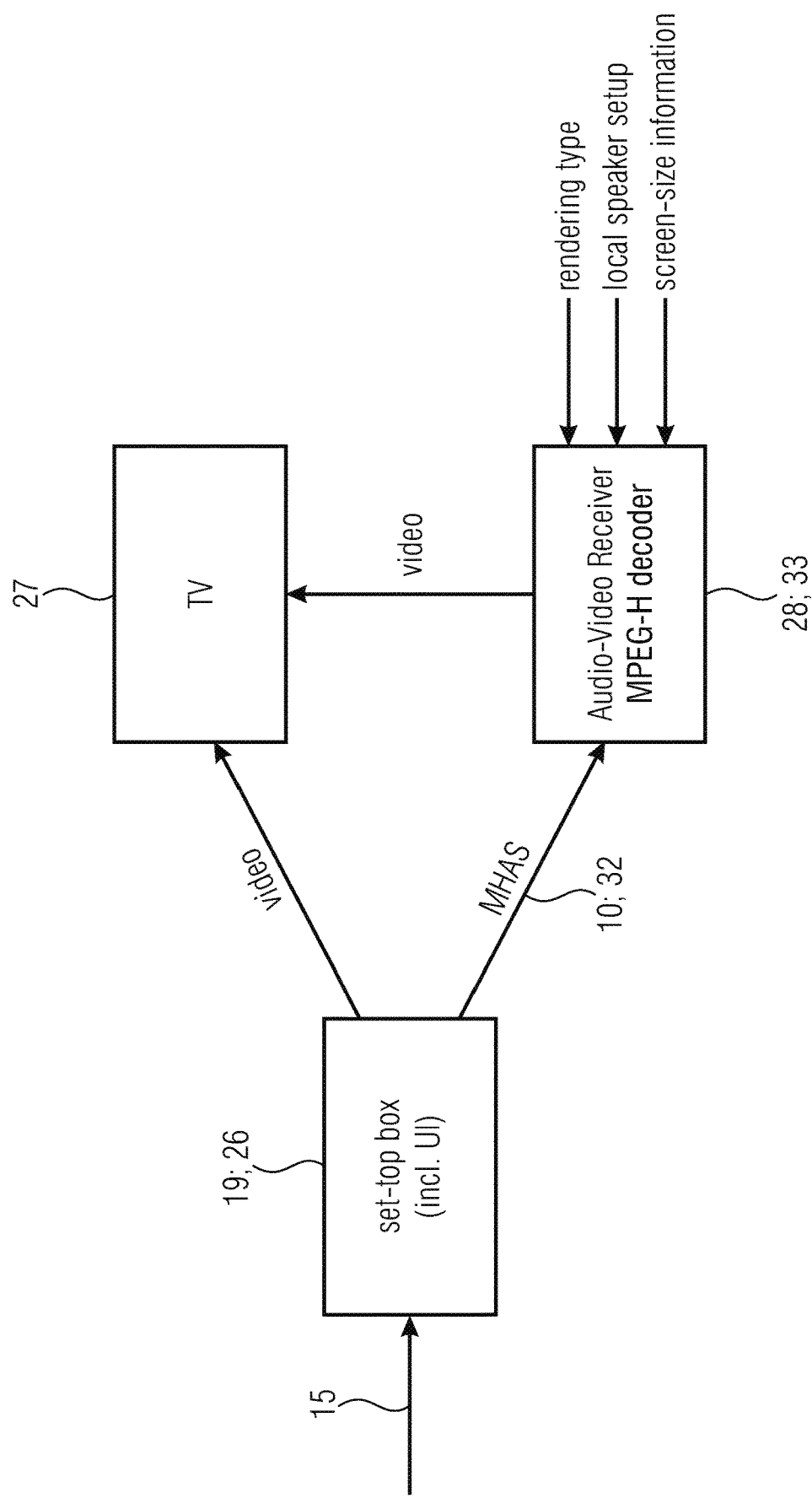
FIG. 9 shows an exemplary scenario with a Set-Top Box and an Audio-Video Receiver.

With reference to FIG. 1 and FIG. 9, the data stream generator 9 is configured to process a data stream 15 comprising the encoded audio data 3 and the metadata 4 received by the receiver interface 2 without decoding the encoded audio data 3. For example, assumed that an audio data processor 1 according to the invention is implemented in a Set-Top Box 19, 26, it may forward an output data stream 10, 32 to an external Audio-Video Receiver 28, 33 that comprises a decoder. In this case, the output data stream 10, 32 may still be encoded as decoding will not be executed by the Set-Top Box 19, 26 but by the Audio-Video Receiver 28, 33.

Alternatively, the data stream generator 9 is configured to copy the encoded audio data 3 and the metadata 4 without changes in the output data stream 10.

Figure 4:
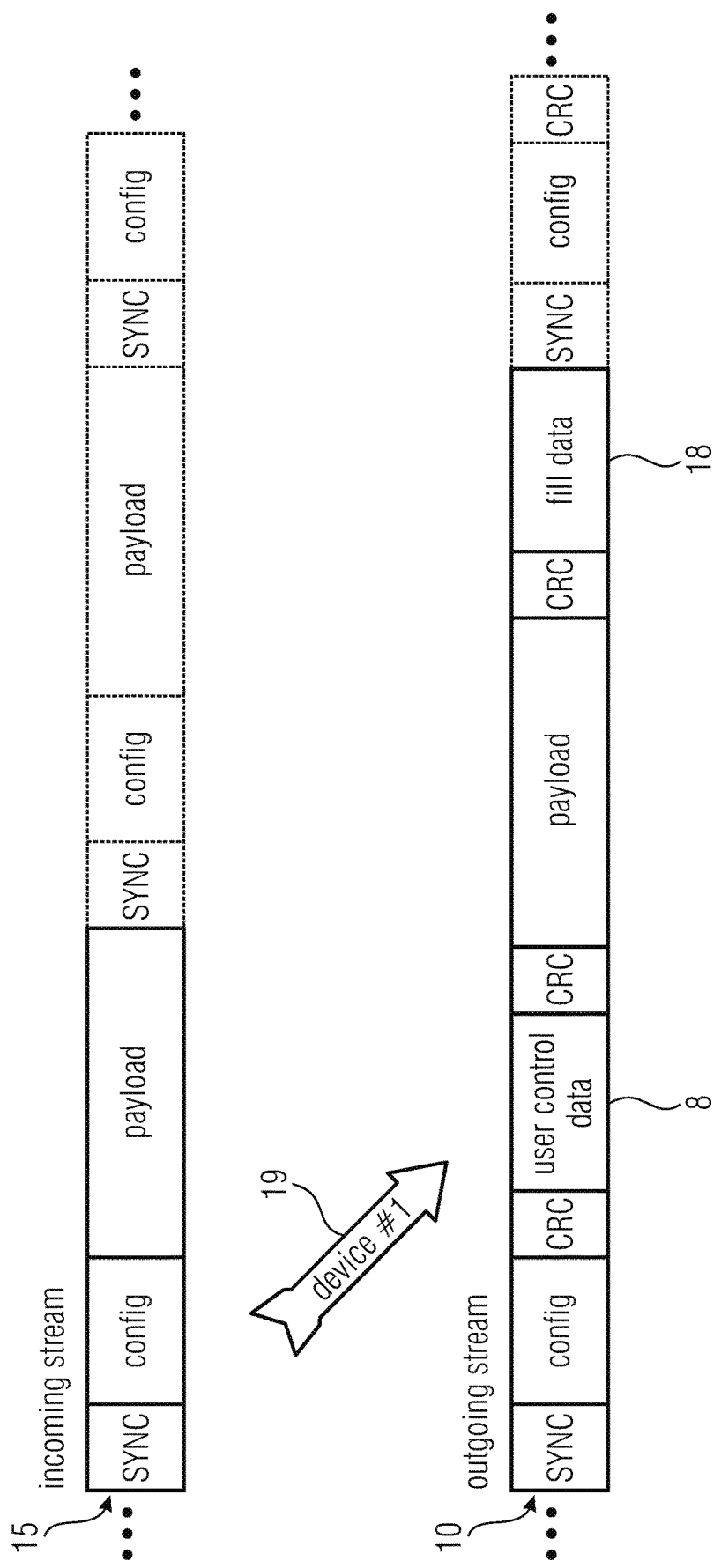
FIG. 4 shows an example of processing input and output streams.

In either case, the data stream generator 9 is configured to add an additional data portion containing the interaction control data 8 to the encoded audio data 3 and/or the metadata 4 in the output data stream 10, as can be seen in FIG. 4.

Figure 5:
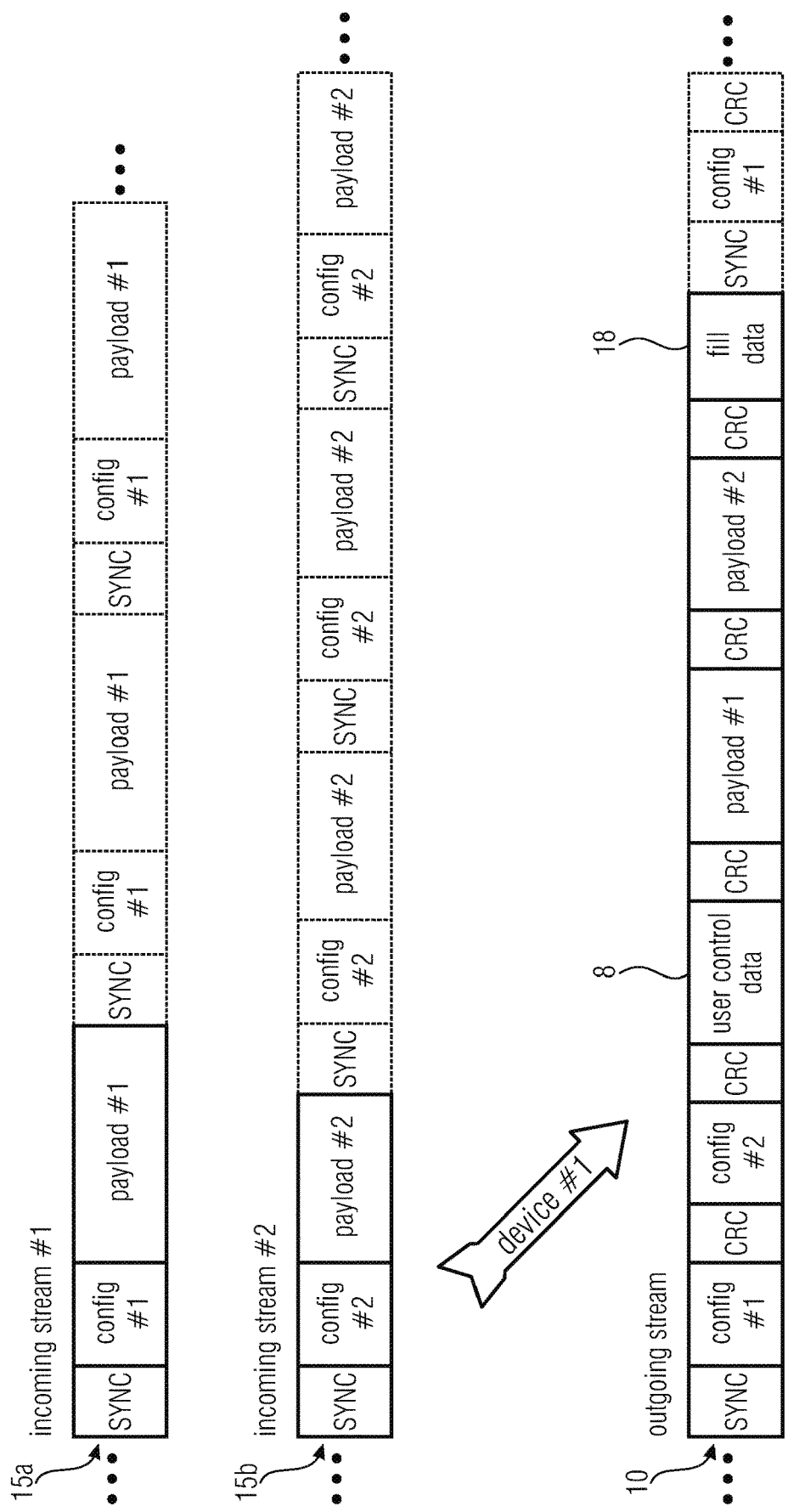
FIG. 5 shows a further example of processing input and output streams.

With reference to FIG. 5, the data stream generator 9 is further configured to merge two input streams 15a, 15b into a common output stream 10, wherein an additional data portion containing the interaction control data 8 is added to the encoded audio data 3 and/or the metadata 4 in the output data stream 10.

Advantageously, the data stream generator 9 is configured to generate, in the output data stream 10, the interaction control data 8 in the same format as the metadata 4. Thus, interaction control data 8 can be easily combined with available metadata 4.

If, as mentioned above, the data stream generator 9 copies the metadata 4, the original meta-data 4 may remain in the output stream 10 in addition to any manipulated meta-data containing additional interaction control data 8 for respective audio objects 11, 12. Both the original and the manipulated meta-data may be sent to a decoder 28, 33 in order to allow the decoder 28, 33 to either identify the differences as result of the (user) interaction and to get all information about the default values as intended by the content creator or to calculate the result of the (user) interaction from the original meta-data 4 and the manipulated meta-data 4' (or interaction control data 8).

Further with reference to FIG. 1, the data stream generator 9 is configured to dynamically generate the output data stream 10. Every time a user or a device provides new interaction input 7 to the interaction interface 6, the interaction control data 8 is updated accordingly in order to match said new interaction input 7. The data stream generator 9 includes this updated interaction control data 8 in the output data stream 10.

Figure 6:
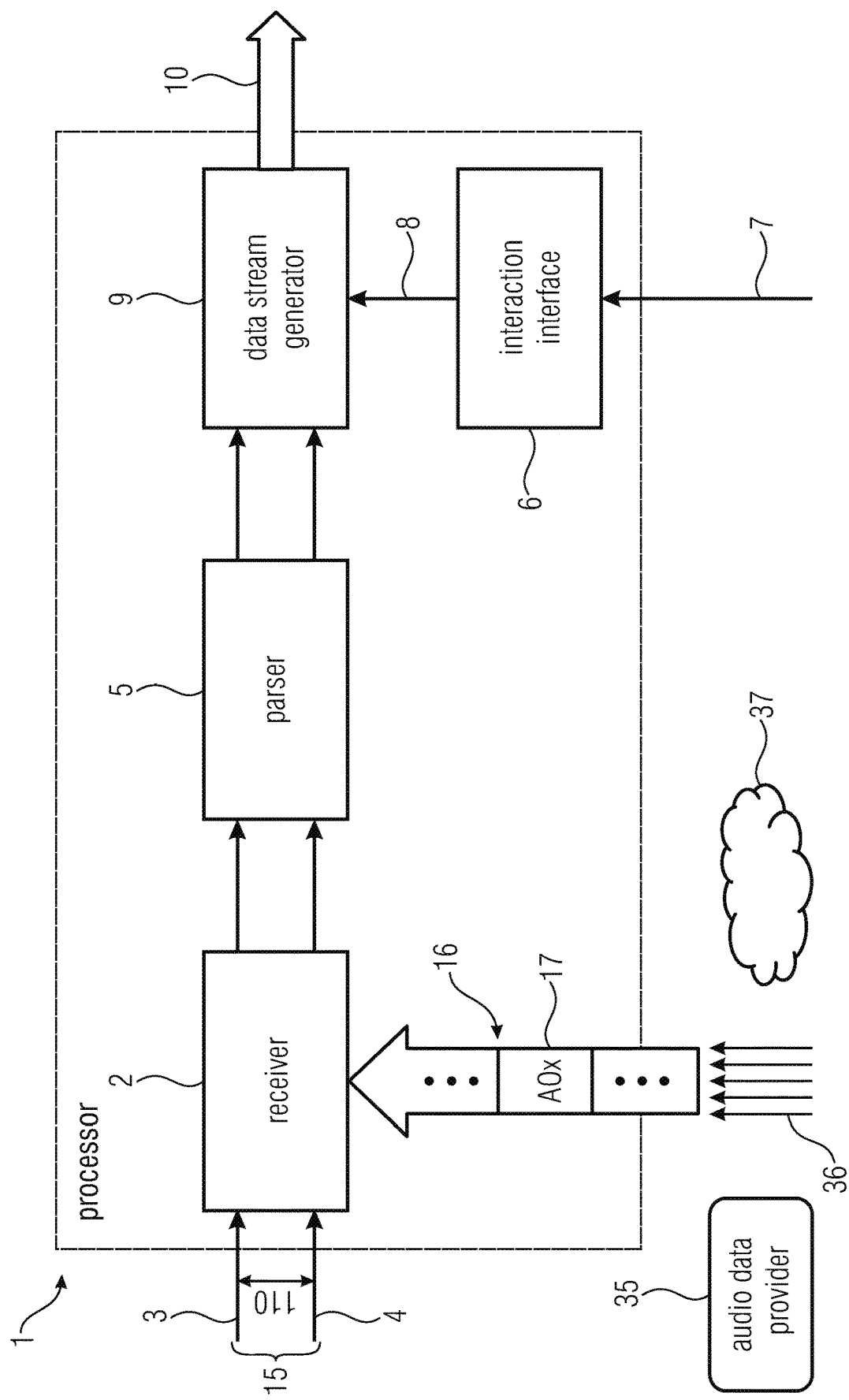
FIG. 6 shows an audio data processor processing optional audio data.

FIG. 6 shows an audio data processor 1 according to the invention, wherein optional audio information is processed. As can be seen, the input data stream 15 is a main audio data stream comprising encoded audio data 3 and related metadata 4. Furthermore, the receiver interface 2 additionally receives optional audio data 16 comprising an optional audio object 17.

However, the metadata related to said additional optional audio object 'AOx' 17, i.e. the information as to the manipulation possibilities of said optional audio object 'AOx' 17, is contained in the main audio data stream 15. Thus, the audio object 17 is known but not present and therefore optional.

For example, the user listens to an orchestra containing drums, strings and a piano. Wind instruments can optionally be included. If the listener now wishes to add a wind instrument, he can do so by adding an optional wind instrument, for example a trumpet, as an optional audio object 17. As the manipulation possibilities for said trumpet are already contained within the metadata 4 of the main audio data stream 15, the user has the possibility of manipulating the currently added trumpet according to his desires.

Further with reference to FIG. 6, said additional audio object 'AOx' 17 may be a missing audio object that is not included in the encoded audio data 3 and/or the metadata 4. Thus, the audio object 17 is not known and is therefore missing.

In this case, the receiver interface 2 is configured to request audio data 16 belonging to said missing audio object 17 from an audio data provider 35. The receiver interface 2 is also configured to receive said audio data 16 from a different substream contained in a broadcast stream 36. The receiver interface 2 is further configured to retrieve said audio data 16 from the Internet 37 via an internet protocol connection.

For example, a user watching a movie can choose a particular language from the available set of languages containing, for instance, English, German and French. A fourth language is known but not present and is therefore missing. However, a fourth language can be subsequently provided via the internet, for example.

Referring to FIG. 4 and FIG. 5 again, the input data stream 15 and the output data stream 10 may generally be available in a packetized structure. For example, transport of MPEG-H Audio over serial interfaces is defined by the MHAS transport syntax (see section 13 of N14459 (ISO/IEC 23008-3 Committee Draft Text) [1]). This syntax is defined in a packetized way.

Therefore, to accomplish the transport of the manipulated meta-data 4 or the interaction control data 8, only one further packet type needs to be assigned for the new control information.

In addition, a first device 'device #1' 19 comprising the audio data processor 1 might want to add additional fill data 18 into a subsequent transmission stream 10 to meet the given, usually much higher data rate requirement for that link. This fill data 18 may contain no information and is expected to be ignored by a second device that receives the manipulated output stream 10. To accomplish this, a further data packet type may be assigned.

Further, as the transport layer of the incoming streams to 'device #1' 19 may have their own error protection, but the outgoing link does not offer such security layer, device #1 may add data packets containing parity check data. These may be added to the MHAS streams as an additional packet type.

Further, as the transport layer may convey additional data as side information, these data packets may also be packed into the MHAS audio stream as another packet type. An example for this data are the descriptors in the MPEG-2 Transport and Program stream.

Another example for storage of encoded audio data is ISO mp4 file format. Similar to the stream format, it is also possible for the case of a file format to read, manipulate and write back the meta-data to the file or to store the user control data in addition to the original meta-data without changing the encoded audio signal data.

REFERENCES

[1] ISO N14459 (ISO/IEC 23008-3 Committee Draft Text)
[2] IEC 60958-3: "Digital audio interface—Part 3: Consumer applications"
[3] IEC 61937-11, "Digital audio—Interface for non-linear PCM encoded audio bitstreams applying IEC 60958—Part 11: MPEG-4 AAC and its extensions in LATM/LOAS"

Figure 7:
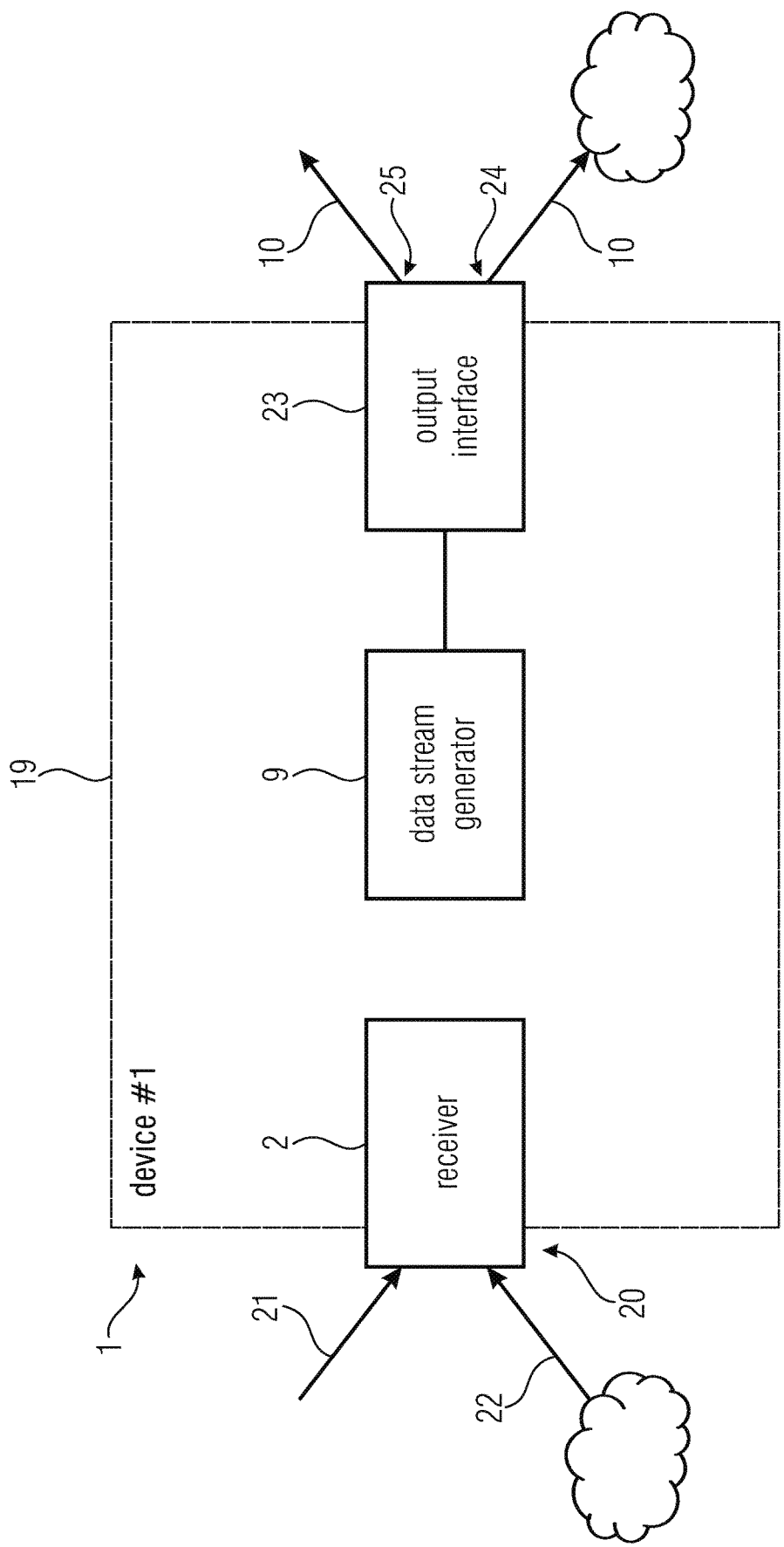
FIG. 7 shows an audio data processor being implemented in a separate device.

Referring now to FIG. 7, the audio data processor 1 is implemented as a separate device 'device #1' 19. In said separate device 19, the receiver interface 2 forms an input 20 to the separate device 19 via a wired connection 21 or a wireless connection 22.

The audio data processor 1 further comprises an output interface 23 that is connected to the data stream generator 9 and provides an output for the device 19. Further, the output interface 23 is configured to output the output data stream 10 via a wireless interface 24 or a wired connector 25.

Further ways of carrying out the invention may be described by way of example in a scenario in which two separate devices are available. A first device 'device #1' comprises the audio data processor according to the invention. A second device 'device #2' receives the processed, but still encoded, audio data from 'device #1' for decoding said audio data.

Figure 8:
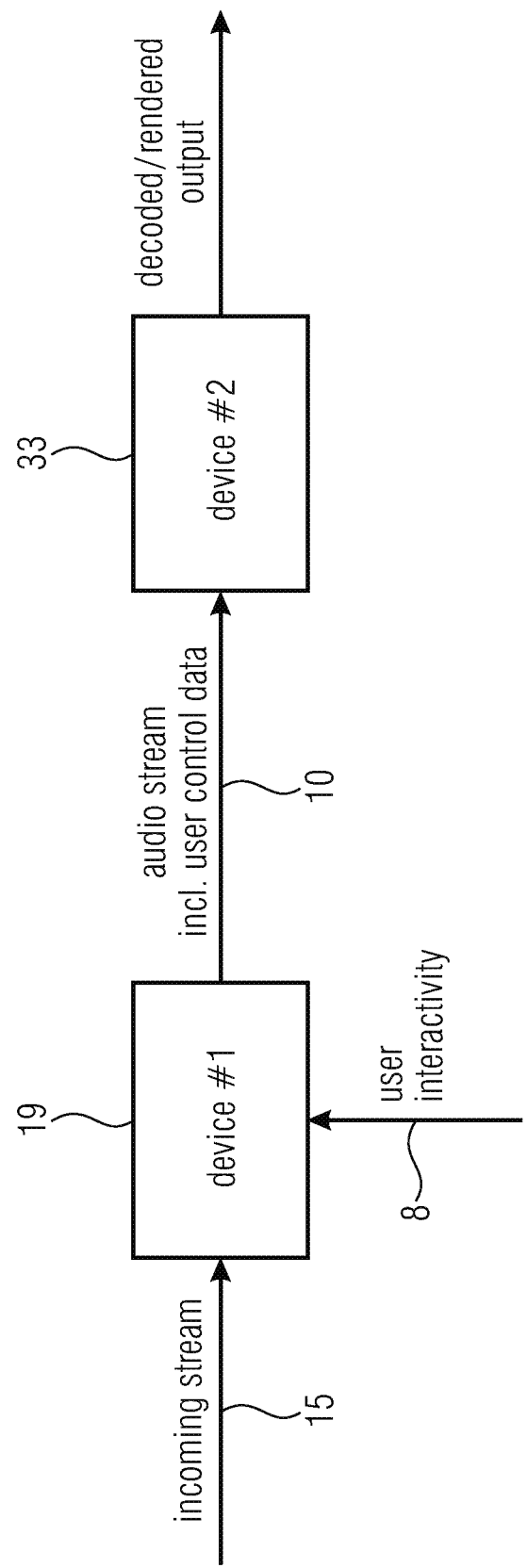
FIG. 8 shows an exemplary use case with a first device and a second device.

As can be seen in FIGS. 8 and 9, the first device 19, 26 receives an input stream 15 comprising encoded audio data 3 and related metadata 4. The first device 19, 26 reads the meta-data information 4 from the incoming audio data stream 15 or transport stream and leaves the encoded audio signal data 3 untouched. The first device 19, 26 parses the meta-data 4 and presents information about the objects to the application e.g. in the interaction interface 6, including the restrictions on object manipulation that are part of the meta-data 4. From the application or interaction interface 6 a user can select and manipulate the objects to adapt the audio presentation to his personal preferences:

Object selection: e.g. select one out of several languages, select optional additional audio objects, etc.

Object manipulation: e.g. changing volume of objects, changing the position of objects like moving an additional commentary from the center speaker to the right speaker or an arbitrary position in between, Selection of presets: instead of selecting and manipulating each object separately, the user may also select a preset from the meta-data. A preset is a pre-selection of objects recommended by the content creator for specific applications or usage scenarios. A preset may contain a combination of objects with e.g. different volume levels, positions and loudness/dynamic range compression data compared to the default presentation.

In the next step, the first device 19, 26 stores the information about the user interactivity (interaction control data 8) into the encoded audio data stream 10, 32. The first device 19, 26 may either write the changed values or the amount of manipulation, e.g. offset values and multiplication factor back to the meta-data part 4 or a dedicated part of the encoded audio data stream so that the output of the first device 19, 26 is again a valid encoded audio stream 10, 32.

The first device 19, 26 may use a different identifier, tag or packet type to encapsulate the manipulated meta-data or the user control data 8, respectively. The original meta-data 4 may remain in the output stream 10, 32 in addition to the manipulated meta-data. A different identifier, tag or packet type is used for the manipulated meta-data or interaction control data 8, respectively, to enable the second device 28, 33 to identify if the meta-data 4 has been manipulated before. The original meta-data 4 remains in the stream 10, 32 to allow the second device 28, 33 to either identify the differences as result of the user or device interaction and to get all information about the default values as intended by the content creator, or to calculate the result of the user or device interaction from the original meta-data 4 and the manipulated meta-data (or user control data 8).

As part of the manipulated metadata, signature data may be embedded in the meta-data 4. The signature may contain information about the application, device or user, that manipulated the metadata 4.

Audio objects that are not selected by the user may either be marked as disabled in the meta-data 4 or interaction control data 8, or alternatively the encoded audio part of these objects may be removed from the audio stream 10.

The process of user or device interactivity can be dynamic, i.e. every time the user or device changes the settings for selection and manipulation, the first device 19, 26 writes those changed values back to the meta-data part 4 of the encoded audio data stream 10.

It is also possible that the second device 28, 33 additionally manipulates the meta-data 4, either because of an automated process (e.g. to adapt the audio scene to the listening situation) or an additional interaction interface. In this case, the second device 28, 33 may write the manipulated values back to the encoded audio data stream 10, e.g. overwriting the values written by the first device 19, 26.

Referring back to FIG. 6, a further way of carrying out the invention is described by way of example in a so called Hybrid Use Case.

The encoded audio data 3 of selected optional audio objects 17 may not be part of the main audio data stream 15, but may be delivered using other transport channels. For instance, the main audio data stream 15 is delivered on a broadcast channel, while the encoded audio data 3 of optional audio objects 17 is delivered on demand over an IP connection 37.

The complete meta-data 4 for all objects is included in the main audio data stream 15 so that all information for interaction and object selection is available in the first device 19. Therefore the process of interaction and storage of the interaction control data 8 to the stream 10 is identical to the case described above.

If a user selects an object 17 and the encoded audio data 3 is not part of the main audio data stream 15, the first device 19 may receive the encoded audio data 3 of this object 17 on a different data connection than the main audio data stream 15, e.g. a different sub-stream 36 within the broadcast stream or an IP connection 37.

In the next step, the first device 19 merges the encoded audio data 3 of the selected object 17 into the main audio stream 15 resulting in a complete audio data stream 10 for further delivery to the second device 33.

Furthermore, a possibility is proposed to transport interaction data 8 embedded in an MPEG-H conformant bitstream 10.

As can be seen in FIG. 9, advanced multimedia systems often do not integrate all desired functionality in one single device, but rather implement different functional components in specialized devices such as Set-Top Boxes 26, TV-Set 27 or AVR-Receiver 28, for instance. These devices communicate via standardized interfaces such as HDMI.

However, it is also possible that at least the audio data processor and a decoder are integrated in one single device. The audio data processor may be provided, i.e. integrated or implemented, together with a decoder within the same (hardware) device. For example, the audio data processor and a decoder may be together provided within a TV, a Set-Top Box, an A/V Receiver, or the like. The audio data processor and the decoder may communicate via internal data bus structures. Such a configuration may be particularly desired in TV-devices comprising System-on-Chip (SoC) solutions.

Accordingly or alternatively, the audio data processor may be implemented as an independent and separate functional component in the same device similar to the case described above for the case of two separate devices, with the only difference that the output interface performs an output of the audio data processor on a connection internal to the device, for example using an internal data bus.

One use-case for an MPEG-H content reproduction with multiple involved devices is the case, when a television program is received by a first device 19 such as a set-top box (STB) 26, which selects the appropriate transmission channel and extracts relevant elementary streams containing desired coded essence. The interaction, i.e. user control for audio element selection and interaction/manipulation is usually implemented here, as well.

The MPEG-H decoder 31 may be not located in the STB 26, but in the Audio-Video-Receiver (AVR) 28 instead. This use-case is depicted in FIG. 9.

In this case, the extracted streams need to be fed to the AVR 28 for reproduction; the transmission between these two devices 26, 28 may be accomplished by either transmitting a decoded/decompressed representation (PCM with audio), or, especially if bandwidth restrictions apply on the used interconnection line, in an encoded representation.

The AVR 28 then only provides a configuration interface which is usually accessed only once by the user when setting up the system and acts in "slave mode" at normal operation times.

As the interaction happens in the STB (device #1) 26 and the decoding and rendering is implemented in the AVR (device #2) 28, it is inevitable to be able to send the user interactivity information from the STB 26 to the AVR 28.

In order to accomplish the described use case and to overcome the described limitations, it is proposed to embed interaction information data 8 into the encoded audio data stream 10, as can be seen in FIG. 8.

The first device 19 reads the meta-data information 4 from the mpegh3daConfig( ) of the incoming audio data stream 15 or through out-of-band signaling such as MPEG-2 TS Descriptors. It then parses the audio element metadata 4 and presents information about the objects in the interaction interface 6, including the restrictions on object manipulation that are part of the metadata 4. From the interaction interface 6 the user can select and manipulate the audio element to adapt the audio presentation to his personal preferences. The "user interaction data" describes the object selection and manipulation.

In the next step, the first device 19 writes this data to the MHAS audio data stream 32 using a new MHASPacketType. The output of the first device 19 is again a valid encoded audio stream 10, 32. The original metadata 4 in the mpegh3daConfig( ) and the encoded audio signal data 3 is not modified.

The presence of a packet of this MHASPacketType enables the second device 28, 33 to identify that a (user) interaction has happened. The original metadata 4 remains in the stream 10, 32 to allow the second device 10, 33 to get all information about the default values as intended by the content creator.

Audio elements that are not selected by the user may either be marked as disabled in the meta-data 4, or alternatively the encoded audio part 3 of the objects may be removed from the audio stream 10.

The process of interaction, i.e. of either device or user interactivity can be dynamic, i.e. every time a user or a device changes the settings for selection and manipulation the first device 19, 26 writes those changed values back to the specified part of the encoded audio data stream 10.

MHAS-Extension

Transport of MPEG-H Audio over serial interfaces is defined by the MHAS transport syntax (see section 13 of N14459 (ISO/IEC 23008-3 Committee Draft Text) [1]). This syntax is defined in a packetized way. Therefore, to accomplish the transport of the user interaction data, only one further packed type needs to be assigned for the new control information:

TABLE 1

Syntax of MHASPacketPayload( )

| Syntax | No. of bits | Mnemonic |
|---|---|---|
| MHASPacketPayload(MHASPacketType) { switch (MHASPacketType) { case PACTYP_SYNC:   0xA5; /* syncword*/   break; case PACTYP_MPEGH3DACFG:   mpegh3daConfig( );   break; case PACTYP_MPEGH3DAFRAME:   mpegh3daFrame( );   break; case PACTYP_SYNCGAP:   syncSpacingLength =   escapedValue(16,24,24);   break; case PACTYP_MARKER:   for (i=0; i< MHASPacketLength; i++) {     marker_byte(i);   }   break; case PACTYP_USERINTERACTION:   mpegh3daElementInteraction( );   break; } ByteAlign( ); } | 8<br><br><br><br><br><br><br><br>16, 40, 64<br><br><br><br>8 | uimsbf<br><br><br><br><br><br><br><br>uimsbf |

TABLE 2

Value of MHASPacketType

| MHASPacketType | Value |
|---|---|
| PACTYP_SYNC | 0 |
| PACTYP_MPEGH3DACFG | 1 |
| PACTYP_MPEGH3DAFRAME | 2 |
| /* reserved for ISO use */ | 3-6 |

TABLE 2-continued

| Value of MHASPacketType | |
|---|---|
| MHASPacketType | Value |
| PACTYP_SYNCGAP | 7 |
| PACTYPE_MARKER | 8 |
| PACTYP_USERINTERACTION | 12 |
| /* reserved for ISO use */ | 13-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is necessitated by the decoder to skip these extensions.

PACTYP_USERINTERACTION

The MHASPacketType PACTYP_USERINTERACTION may be used to feed element interaction data to the decoder.

For this packet type, MHASPacketLabel has the same value as the packet of MHASPacketType PACTYP_MPEGH3DACFG, to which the (user) interaction data 8 refers to.

Syntax

The syntax element mpegh3daElementInteraction( ) (see [2]) from the interface for user interaction is re-used for carrying the (user) interaction data 8 embedded in the bitstream 10.

REFERENCES

[1] ISO/IEC JTC1/SC29/WG11 N14459, "Text of ISO/IEC 23008-3/CD, 3D audio"
[2] FhG, "Normative Interface for User Interaction", Input to the Meeting of AHG on 3D Audio, DRC and Audio Maintenance, Jun. 2-3, 2014, Paris, France Furthermore, a possible syntax is proposed for a normative interface for user interactivity.

It is proposed to extract the interface for the interaction control from interface for the rendering control. The mpegh3daAudioRendering( ) syntax element then defines the rendering parameters and a newly defined mpegh3daElementInteraction( ) syntax element contains the information that is needed for (user) interaction.

Definition of the mepegh3daElementInteraction( ) Syntax Element

The mpegh3daElementInteraction( ) syntax element provides an interface for any possible (user) interactions. Two interaction modes are defined.

The first one is an advanced interaction mode, where the interaction can be signaled for each element group that is present in the audio scene. This mode enables the user to freely choose (within the restrictions of switch group definitions) which groups to play back and to interact with all of them (within the given ranges and restrictions).

The second mode is a basic interaction mode, where the user could choose one of the defined GroupPresets (from the mae_AudioSceneInfo( ) syntax element, see 14.2 of [1]) as a preset. The on-off status of the groups that are referenced in the conditions of the chosen GroupPresets is then defined and cannot be changed by the user. The user can only change the on-off status of the other groups and position and gain of all groups according to the defined allowances and ranges.

Four different element modifications are distinguished:

On/Off interactivity: A group of elements is switched on or off (Editorial Note: formerly called "object change" [4])

Position interactivity: The positions of a group of elements are changed (azimuth, elevation and distance, editorial note: formerly called "position change" [4])

Gain interactivity: The level/gain of a group of elements is changed (Editorial Note: formerly called "gain change" [4])

WIRE interactivity: A WIRE output is an arbitrary output in addition to the connected loudspeakers. The audio content of the elements of a group are routed to a WIRE output, e.g. content for hearing impaired or an additional language track.

All modifications are defined on a group of element level, because groups gather related elements that should only be manipulated jointly.

A signature is introduced to signal e.g. in which device the interactivity has happened.

TABLE 3a

| Syntax of mpegh3daElementInteraction( ) | | |
|---|---|---|
| Syntax | No. of bits | Mnemonic |
| mpegh3daElementInteraction( ) { | | |
|   ei_InteractionSignatureDataLength; | 8 | uimsbf |
|   if (ei_InteractionSignatureDataLength >0) { | | |
|     ei_InteractionSignatureDataType; | 8 | uimsbf |
|     for ( c = 0; c < | | |
|     bsInteractionSignatureDataLength + 1; | | |
| c++ ) { | | |
|       ei_InteractionSignatureData[c]; | 8 | uimsbf |
|     } | | |
|   } | | |
|   ElementInteractionData( ); | | |
| } | | | ei_InteractionSignatureDataLength This field defines the length of the following interaction signature in Byte.

ei_InteractionSignatureDataType This field defines the type of signature. The following values are possible:

A further embodiment of mpegh3daElementInteraction( ) is shown in Table 3b:

TABLE 3b

| Syntax of mpegh3daElementInteraction( ) | | |
|---|---|---|
| Syntax | No. of bits | Mnemonic |
| mpegh3daElementInteraction( ) { | | |
|   ei_InteractionSignatureDataLength; | 8 | uimsbf |
|   if (ei_InteractionSignatureDataLength >0) { | | |
|     ei_InteractionSignatureDataType; | 8 | uimsbf |
|     for ( c = 0; c < | | |
|     bsInteractionSignatureDataLength + 1; | | |
| c++ ) { | | |
|       ei_InteractionSignatureData[c]; | 8 | uimsbf |
|     } | | |
|   } | | |
|   ElementInteractionData( ); | | |
|   hasLocalZoomAreaSize; | 1 | bslbf |
|   if (hasLocalZoomAreaSize) { | | |
|     LocalZoomAreaSize( ); | | |
|   } | | |
| } | | |

TABLE 4a

Value of ei_InteractionSignatureDataType

| value | meaning |
|---|---|
| 0 | Generic String |
| 1-127 | Reserved for ISO use |
| 128-255 | Reserved for use outside of ISO scope | ei_InteractionSignatureData This field contains a signature defining the originator of the interaction data.

A further embodiment of ei_InteractionSignatureDataType is shown in Table 4b:

TABLE 4b

Value of ei_InteractionSignatureDataType

| value | meaning |
|---|---|
| 0 | Generic String in UTF-8 according to ISO/IEC 10646 |
| 1-127 | Reserved for ISO use |
| 128-255 | Reserved for use outside of ISO scope | ei_InteractionSignatureData This field contains a signature defining the originator of the interaction data.

hasLocalZoomAreaSize Flag that defines if information about the local zoom area size is available. If this flag is enabled, Object Remapping for Zooming is applied.

TABLE 5

Syntax of ElementInteractionData( )

| Syntax | No. of bits | Mnemonic |
|---|---|---|
| ElementInteractionData( ) { | | |
|   ei_interactionMode; | 1 | bslbf |
|   ei_numGroups; /* Channel, Object, HOA, SAOC */ | 7 | uimsbf |
|   if ( ei_interactionMode == 0 ) { | | |
|     /* direct element group interaction = advanced */ | | |
|     ei_GroupInteractivityStatus( | | |
|     ei_numGroups ); | | |
|   } else { | | |
|     /*GroupPreset interaction = basic */ | | |
|     ei_groupPresetID; | 5 | uimsbf |
|     ei_GroupInteractivityStatus( | | |
|     ei_numGroups); | | |
|   } | | |
| } | | | ei_interactionMode Flag that defines if the advanced interaction type or the basic interaction mode is chosen.

ei_numGroups This field contains the number of groups in the audio scene.

ei_groupPresetID This field contains a groupPresetID that is defined in the audio scene. This ID reflects the user's preset choice.

TABLE 6a

Syntax of ei_GroupInteractivityStatus( )

| Syntax | No. of bits | Mnemonic |
|---|---|---|
| ei_GroupInteractivityStatus ( numGroups ) | | |
| { | | |
|   for (grp = 0; grp < numGroups; grp++) { | | |
|     ei_groupID[grp]; | 7 | uimsbf |
|     ei_onOff[grp]; | 1 | bslbf |
|     ei_routeToWIRE[grp]; | 1 | bslbf |
|     if ( ei_routeToWIRE[grp] == 1 ) { | | |
|       routeToWireID[grp]; | 4 | uimsbf |
|     } | | |
|     if ( ei_onOff [grp] == 1) { | | |
|       ei_changePosition[grp]; /* position change */ | 1 | bslbf |
|       if ( ei_changePosition[grp] ) { | | |
|         ei_azOffset[grp]; | 8 | uimsbf |
|         ei_elOffset[grp]; | 6 | uimsbf |
|         ei_distFact[grp]; | 4 | uimsbf |
|       } | | |
|       ei_changeGain; /* gain change */ | 1 | bslbf |
|       if ( ei_changeGain ) { | | |
|         ei_gain; | 7 | uimsbf |
|       } | | |
|     } | | |
|   } | | |
| } | | | ei_groupID GroupID for the current group for which the interaction is described.

ei_routeToWIRE This field defines if the audio content of the group should be routed to a WIRE output.

ei_routeToWireID ID of the WIRE output where the group should be routed to.

ei_onOff Defines the on-off status of the current group. In case the basic interaction mode (interaction on GroupPresets) is chosen, this value has to be identical to the defined on-off status of the group with ei_groupID if this group is part of the conditions of the chosen GroupPreset with ei_groupPrersetID. For basic interaction mode it is not allowed to signal a different on-off status here. The on-off status of all groups that are not part of the conditions of the chosen GroupPreset, the on-off status could arbitrarily be signaled.

ei_changePosition This flag defines if the position of the group elements has been changed.

ei_azOffset The change of azimuth is given as an offset. This field can take values between AzOffset=−180° and AzOffset=180°:

AzOffset=1.5·(ei_azOffset−128)

AzOffset=min (max(AzOffset, −180), 180);

ei_elOffset The change of azimuth is given as an offset. This field can take values between ElOffset=−90° and ElOffset=90°:

ElOffset=3·(ei_elOffset−32)

ElOffset=min (max (ElOffset, −90), 90);

ei_distFact The distance interactivity is given as a multiplication factor. The field can take values between 0 to 15 resulting in DistFactor between 0.00025 and 8:

DistFactor=$2^{((ei\_distFactorr-8)-4)}$

DistFactor=min(max(DistFactor, 0.00025), 8);

ei_changeGain This flag defines if the gain/level of the group elements has been changed.

ei_gain This field defines an additional gain of the members of the current group. The field can take values between 0 and 127 representing gain values between Gain=−63 dB and Gain=31 dB in 1 dB steps, with Gain [dB]=ei_gain−64

Gain [dB]=min(max(Gain, −63), 31);

If ei_gain is set to 0, Gain shall be set to minus infinity dB.

A further embodiment of ei_GroupInteractivityStatus( ) is shown in Table 6b:

TABLE 6b

Syntax of ei_GroupInteractivityStatus( )

| Syntax | No. of bits | Mnemonic |
|---|---|---|
| ei_GroupInteractivityStatus ( numGroups ) | | |
| { | | |
|   for (grp = 0; grp < numGroups; grp++) { | | |
|     ei_groupID[grp]; | 7 | uimsbf |
|     ei_onOff[grp]; | 1 | bslbf |
|     ei_routeToWIRE[grp]; | 1 | bslbf |
|     if ( ei_routeToWIRE[grp] == 1 ) { | | |
|       routeToWireID[grp]; | 16 | uimsbf |
|     } | | |
|     if ( ei_onOff [grp] == 1) { | | |
|       ei_changePosition[grp]; /* position change */ | 1 | bslbf |
|       if ( ei_changePosition[grp] ) { | | |
|         ei_azOffset[grp]; | 8 | uimsbf |
|         ei_elOffset[grp]; | 6 | uimsbf |
|         ei_distFact[grp]; | 4 | uimsbf |
|       } | | |
|       ei_changeGain; /* gain change */ | 1 | bslbf |
|       if ( ei_changeGain ) { | | |
|         ei_gain; | 7 | uimsbf |
|       } | | |
|     } | | |
|   } | | |
| } | | |

The interaction data is defined according to the Metadata Audio Element fields (see 14.2 of [1]). In the metadata audio element definition, the interactivity range for gain interactivity is given in dB, the interactivity ranges for azimuth and elevation are given as minimum and maximum offset values (with the same resolution as here: 1.5° for azimuth and 3° for elevation) and the ranges for distance are given as multiplication factors. Therefore, the interface is defined in a similar way.

For the user interaction, all possible changes (on/off, gain, position, WIRE) for all element groups are signaled inside one ElementInteraction( ) syntax element instead of using one repetition of a syntax element for each interaction type and each group or element.

WIRE output is also defined for groups that are switched off, because only then it is possible to route alternative language tracks to a WIRE output. The possible violated switch group logic has to be handled in the decoder.

The content type (channel, object, HOA) that was formerly proposed in [4] is removed here. It is already implicitly known by the groupID, because each group of elements has a signalGroupType (Channels, Objects, SAOC, HOA) that defines the signal content type and is signaled in the syntax element Signals3d( )).

Basic Interaction via GroupPresets

If the basic interaction mode is set, the user can choose one of the defined GroupPresets (from the mae_AudioSceneInfo( ) groupCollection syntax element, proposed as candidate technology in w14464 [7]).

The conditions from the chosen preset define the on-off status of the referenced groups. The user should not be able to modify the on-off status for these groups.

The corresponding field ei_onOff in the syntax element ei_GroupInteractivityStatus [2] has to reflect the condition in the chosen groupPreset for all groups that are referenced in the conditions of the chosen groupPreset.

The on-off status of all other groups can be chosen by the user.

CONCLUSION

This contribution proposes a definition for an interface for user interaction. An interface definition is provided that allows for two different interaction modes (basic and advanced). It is proposed to adopt the proposed interface to the CD.

REFERENCES

[1] ISO/IEC JTC1/SC29/WG11 N14459, "Text of ISO/IEC 23008-3/CD, 3D audio"

[2] FhG, "Rendering Interfaces to MPEG-H and Unification of Loudspeaker Signaling", Input to the Meeting of AHG on 3D Audio, DRC and Audio Maintenance, Jun. 2-3, 2014, Paris, France

[3] ISO/IEC JTC1/SC29/WG11 N14463, "Normative Interface for Binaural Data", April 2014, Valencia, Spain

[4] ISO/IEC JTC1/SC29/WG11 M33134, "3D Audio Decoder Interfaces", April 2014, Valencia, Spain (Input from Philips)

[5] ISO/IEC JTC1/SC29/WG11 M31427, "Thoughts on binaural parameterization of MPEG codecs", October 2013, Geneva, Switzerland (Input from Orange)

[6] ISO/IEC JTC1/SC29/WG11 M30249, "BRIR interface format: update and implementation", July 2013, Vienna, Austria (Input from Philips)

[7] ISO/IEC JTC1/SC29/WG11 N14464 "Candidate Technologies for 3D Audio"

Furthermore, section 13 of the ISO/IEC 23008-3 CD text [1] defines the MHAS syntax to be used to encapsulate MPEG-H 3D Audio payloads in (real-time) streams. With this document additional capabilities to enable a reliable usage of MHAS in other transport systems besides MPEG-2 Transport Stream are proposed.

Filldata

Certain transmission channels may only be operated at constant instantaneous bitrate. To accomplish this, a fill data packet type is proposed to be able to fill the MHAS stream up to a certain given bitrate.

CRC The MPEG-2 Transport Stream layer [2] takes care of protecting the encapsulated MHAS elementary stream. Thus data loss or data corruption in transmission may be identified.

On the other hand, common serial interfaces (e.g. AES/EBU, S/PDIF, [3], [4], [5]) provide no sufficient error protection. An optional CRC packet type is proposed to enable error detection if MHAS is used on such interfaces.

Descriptor Encapsulation

MHAS streams are used to convey encoded audio to or from MPEG-2 Transport stream encoders/decoders. It is proposed to convey related descriptor information in an additional MHAS packet type.

TABLE 7

Syntax of MHASPacketPayload( )

| Syntax | No. of bits | Mnemonic |
|---|---|---|
| MHASPacketPayload(MHASPacketType) { | | |
|   switch (MHASPacketType) { | | |
|     case PACTYP_SYNC: | | |
|       0xA5; /* syncword*/ | 8 | uimsbf |
|       break; | | |
|     case PACTYP_MPEGH3DACFG: | | |
|       mpegh3daConfig( ); | | |
|       break; | | |
|     case PACTYP_MPEGH3DAFRAME: | | |
|       mpegh3daFrame( ); | | |
|       break; | | |
|     case PACTYP_FILLDATA: | | |
|       for (i=0; i< MHASPacketLength; i++) { | | |
|         mhas_fill_data_byte(i); | 8 | bslbf |
|       } | | |
|       break; | | |
|     case PACTYP_SYNCGAP: | | |
|       syncSpacingLength = escapedValue(16,24,24); | 16, 40, 64 | uimsbf |
|       break; | | |
|     case PACTYP_MARKER: | | |
|       for (i=0; i< MHASPacketLength; i++) { | | |
|         marker_byte(i); | 8 | |
|       } | | |
|       break; | | |
|     case PACTYP_CRC16: | | |
|       mhasParity16Data; | 16 | bslbf |
|       break; | | |
|     case PACTYP_CRC32: | | |
|       mhasParity32Data; | 32 | bslbf |
|       break; | | |
|     case PACTYP_DESCRIPTOR: | | |
|       for (i=0; i< MHASPacketLength; i++) { | | |
|         mhas_descriptor_data_byte(i); | 8 | bslbf |
|       } | | |
|       break; | | |
|   } | | |
|   ByteAlign( ); | | |
| } | | |

TABLE 8a

Value of MHASPacketType

| MHASPacketType | Value |
|---|---|
| PACTYP_SYNC | 0 |
| PACTYP_MPEGH3DACFG | 1 |
| PACTYP_MPEGH3DAFRAME | 2 |
| /* reserved for ISO use */ | 3-5 |
| PACTYPE_FILLDATA | 6 |
| PACTYP_SYNCGAP | 7 |
| PACTYPE_MARKER | 8 |
| PACTYPE_CRC16 | 9 |
| PACTYPE_CRC32 | 10 |
| PACTYPE_DESCRIPTOR | 11 |
| /* reserved for ISO use */ | 13-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is necessitated by the decoder to skip these extensions.

A further embodiment of MHASPacketType is shown in Table 8b:

TABLE 8b

Value of MHASPacketType

| MHASPacketType | Value |
|---|---|
| PACTYP_SYNC | 6 |
| PACTYP_MPEGH3DACFG | 1 |
| PACTYP_MPEGH3DAFRAME | 2 |
| /* reserved for ISO use */ | 3-5 |
| PACTYPE_FILLDATA | 0 |
| PACTYP_SYNCGAP | 7 |
| PACTYPE_MARKER | 8 |
| PACTYPE_CRC16 | 9 |
| PACTYPE_CRC32 | 10 |
| PACTYPE_DESCRIPTOR | 11 |
| /* reserved for ISO use */ | 13-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is necessitated by the decoder to skip these extensions.

mhasParity16Data a 16-bit field that contains the CRC value that yields a zero output of the 16 registers in the decoder with the polynomial:

$$x^{16}+x^{15}+x^5+1$$

and the initial state of the shift register of 0xFFFF.

mhasParity32Data a 32-bit field that contains the CRC value that yields a zero output of the 32 registers in the decoder with the polynomial:

$$x^{32}+x^{26}+x^{23}+x^{22}+x^{16}+x^{12}+x^{11}+x^{10}+x^8+x^7+x^5+x^4+x^2+x+1$$

and the initial state of the shift register of 0xFFFFFFFF.
mhas_fill_data_byte 8-bit data elements, no restrictions apply Random Access/Immediate Playout Marker When the first marker_byte of the packet payload is "0x02", the following packet of type PACTYP_MPEG3DAFRAME with identical MHASPacketLabel is encoded following the rules given in section 5.5.5 "Audio Pre-Roll".

Program Boundary Marker

When the first marker_byte of the packet payload is "0x03", a program boundary occurs at this point in time and all following packets belong to a new program.

PSCTYP_CRC16 and PACTYP_CRC32

The MHASPacketType PACTYP_CRC16 and PACTYP_CRC32 may be used for detection of errors in the preceding MHAS packet with MHASPacketLabel set to the same value. It shall directly follow the MHAS packet its CRC value refers to. This may be beneficial when an MHAS stream is conveyed over an error prone channel.

The error detection method uses one of the generator polynomial and associated shift register states as defined for mhasParity16Data or mhasParity32Data respectively.

The bits included into the CRC-check are the complete MHASPacketPayload( ) for the related MHAS packet followed by the for mhasParity16Data or mhasParity32Data words respectively.

In the case where there are no errors, each of the outputs of the shift register shall be zero. At the CRC encoder the mhasParity16Data/mhasParity32Data field is encoded with a value such that this is ensured.

PACTYP_FILLDATA

The MHASPacketType PACTYP_FILLDATA provides the possibility to add fill data to adjust the instantaneous bit-rate. This may be desirable in certain real-time applications using a constant rate transmission channel.

As packets of this type do not relate to certain payload data, MHASPacketLabel is set to 0.

It is expected that decoder neglect the data transmitted in packets of type PACTYP_FILLDATA. Further, intermediate tools processing an MHAS streams are allowed to remove such packets from the stream.

It is allowed to set MHASPacketLength to 0. This yields in minimum packet size of 2 bytes.

PACTYP_DESCRIPTOR

The PACTYP_DESCRIPTOR may be used to embed MPEG-2 TS/PS descriptors in MHAS streams. Data conveyed as mhas_descriptor_data_byte have the same syntax and semantics than defined for descriptor( ) in ISO/IEC 13818-1.

For this packet type and for descriptors transmitted in the first descriptor loop in the TS_program_map_section( ) (see ISO/IEC 13818-1), the MHASPacketLabel is set to 0. For this packet type and for descriptors assigned to one elementary stream (i.e. the second descriptor loop in the TS_program_map_section( )), MHASPacketLabel is set to the same value as the PACTYPE_CONFIG from the associated elementary stream.

REFERENCES

[1] ISO/IEC JTC1/SC29/WG11 N14459, "Text of ISO/IEC 23008-3/CD, 3D audio"
[2] ISO/IEC 13818-1:2013, Information technology—Generic Coding of moving pictures and associated audio information: Systems
[3] IEC 60958-3: "Digital audio interface—Part 3: Consumer applications"
[4] IEC 61937-11, "Digital audio—Interface for non-linear PCM encoded audio bitstreams applying IEC 60958—Part 11: MPEG-4 AAC and its extensions in LATM/LOAS"
[5] SMPTE 2041: Format for Non-PCM Audio and Data in AES-3—MPEG-4 AAC and HE AAC Compressed Digital Audio in ADTS and LATM/LOAS Wrappers Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio data processor for processing packetized audio data, the audio data processor comprising:
 a receiver interface for receiving encoded audio data comprising audio elements and metadata related to the audio elements;
 a metadata parser for parsing the metadata to determine an audio data manipulation possibility of the audio elements;
 an interaction interface configured to receive an interaction input and configured to generate, from the interaction input, interaction control data related to the audio data manipulation possibility for manipulating the audio elements externally from a decoder;
  wherein from the interaction interface a user can select and manipulate the audio elements to adapt the audio presentation to his personal preferences; and
 a data stream generator configured to acquire the interaction control data and the encoded audio data and the metadata and configured to generate an output data stream, the output data stream being again a valid encoded audio stream comprising the still encoded audio data, the metadata, and the interaction control data.

2. The audio data processor of claim 1,
 wherein the interaction interface provides two interaction modes,
  wherein a first interaction mode is an advanced interaction mode that is signaled for each audio element group being present in an audio scene for enabling the user to freely choose which audio element groups to play back and to interact with all of them, and
  wherein a second mode is a basic interaction mode comprising Group Presets, for enabling the user to choose one of the Group Presets as a preset,
 wherein audio element groups gather related audio elements that are to be manipulated jointly.

3. The audio data processor of claim 2,
 wherein the Group Presets comprise at least one of:
  an On/Off interactivity, wherein a group of elements is switched on or off;
  a position interactivity, wherein the positions of a group of elements are changed;
  a gain interactivity, wherein the level or gain of a group of elements is changed;
  WIRE interactivity, wherein the audio content of the elements of a group are routed to a WIRE output.

4. The audio data processor of claim 1,
 wherein the output data stream is sent to the decoder, wherein the presence of the interaction control data in the output data stream enables said decoder to identify that an interaction has happened.

5. The audio data processor of claim 1,
 wherein the encoded audio data comprises separate encoded audio elements, wherein the metadata is related to the audio elements,
 wherein the metadata parser is configured to parse a corresponding portion of the metadata corresponding to the encoded audio elements and to determine, for at least one of the audio elements, the audio manipulation possibility, and
 wherein the interaction interface is configured to generate, for the at least one encoded audio element, interaction control data being related to the at least one encoded audio element.

6. The audio data processor of claim 1,
 wherein the interaction interface is configured to
 present, to the user, the audio data manipulation possibility derived from the metadata by the metadata parser, and
 to receive, from the user, a user input on the specific data manipulation of the audio data manipulation possibility.

7. The audio data processor of claim 1,
 wherein the data stream generator is configured to
 process a data stream comprising the encoded audio data and the metadata received by the receiver interface without decoding the encoded audio data, or
 copy the encoded audio data and the metadata without changes in the output data stream, and
 wherein the data stream generator is configured to
  add an additional data portion containing the interaction control data to the encoded audio data or to the metadata in the output data stream.

8. The audio data processor of claim 1,
 wherein the data stream generator is configured to generate, in the output data stream, the interaction control data in a same format as the metadata.

9. The audio data processor of claim 1,
 wherein the data stream generator is configured to associate, with the interaction control data, an identifier in the output data stream, the identifier being different from an identifier associated with the metadata.

10. The audio data processor of claim 1,
 wherein the data stream generator is configured to add, to the interaction control data, signature data, the signature data indicating information on an application, a device or a user performing an audio data manipulation or providing the interaction input.

11. The audio data processor of claim 1,
 wherein the metadata parser is configured to identify a disabling possibility for one or more audio elements,
 wherein the interaction interface is configured to receive a disabling information for the one or more audio elements, and
 wherein the data stream generator is configured to mark the one or more audio elements as disabled in the interaction control data, or to remove the disabled one or more audio elements from the encoded audio data so that the output data stream does not include encoded audio data for the disabled one or more audio elements.

12. The audio data processor of claim 1,
 wherein the data stream generator is configured to dynamically generate the output data stream, wherein in response to a new interaction input, the interaction control data is updated to match the new interaction input, and
 wherein the data stream generator is configured to include the updated interaction control data in the output data stream.

13. The audio data processor of claim 1,
 wherein the receiver interface is configured to receive a main audio data stream comprising the encoded audio data and the metadata related to the encoded audio data, and to additionally receive optional audio data comprising an optional audio element,
wherein the metadata related to said optional audio element is contained in said main audio data stream.

14. The audio data processor of claim 1,
wherein the metadata parser is configured to determine the audio manipulation possibility for an optional audio element that is not included in the encoded audio data,
wherein the interaction interface is configured to receive an interaction input for the optional audio element, and
wherein the receiver interface is configured to request audio data for the optional audio element from an audio data provider or to receive the audio data for the optional audio element from a different substream contained in a broadcast stream or an internet protocol connection.

15. The audio data processor of claim 1,
wherein the data stream generator is configured to assign, in the output data stream, a further packet type to the interaction control data, the further packet type being different from packet types for the encoded audio data and the metadata, or
wherein the data stream generator is configured to add, into the output data stream, fill data in a fill data packet type, wherein an amount of fill data is determined based on a data rate requirement determined by an output interface of the audio data processor.

16. The audio data processor of claim 1,
being implemented as a separate first device that is separated from a second device which is configured to receive the processed, but still encoded, audio data from the first device for decoding said audio data,
wherein the receiver interface forms an input to the separate first device via a wired or wireless connection,
wherein the audio data processor further comprises an output interface connected to the data stream generator, the output interface being configured for outputting the output data stream, and
wherein the output interface performs an output of the separate first device and comprises a wireless interface or a wired connector.

17. A method for processing packetized audio data, the method comprising:
receiving encoded audio data comprising audio elements and metadata related to the audio elements;
parsing the metadata to determine an audio data manipulation possibility of the audio elements;
receiving an interaction input and generating, from the interaction input, interaction control data related to the audio data manipulation possibility for manipulating the audio elements externally from a decoder;
wherein by said interaction input a user can select and manipulate the audio elements to adapt the audio presentation to his personal preferences; and
obtaining the interaction control data and the encoded audio data and the metadata, and
generating an output data stream, the output data stream being again a valid encoded audio stream comprising the still encoded audio data, the metadata, and the interaction control data.

18. A computer program for performing, when running on a computer or a processor, a method for processing packetized audio data, the method comprising:
receiving encoded audio data comprising audio elements and metadata related to the audio elements;
parsing the metadata to determine an audio data manipulation possibility of the audio elements;
receiving an interaction input and generating, from the interaction input, interaction control data related to the audio data manipulation possibility for manipulating the audio elements externally from a decoder;
wherein by said interaction input a user can select and manipulate the audio elements to adapt the audio presentation to his personal preferences; and
obtaining the interaction control data and the encoded audio data and the metadata, and
generating an output data stream, the output data stream being again a valid encoded audio stream comprising the still encoded audio data, the metadata, and the interaction control data.

* * * * *